Sept. 28, 1965  C. E. PALMER ETAL  3,208,717
VALVE

Filed Jan. 29, 1962  2 Sheets-Sheet 1

INVENTORS
CHARLES E. PALMER
ROBERT H. PALMER
BY
Charles L. Lovercheck
attorney

Sept. 28, 1965     C. E. PALMER ETAL     3,208,717

VALVE

Filed Jan. 29, 1962     2 Sheets-Sheet 2

INVENTORS
CHARLES E. PALMER
ROBERT H. PALMER
BY
Charles L Rosenbush
attorney

United States Patent Office 3,208,717
Patented Sept. 28, 1965

3,208,717
VALVE
Charles E. Palmer and Robert H. Palmer, Lake City, Pa., assignors to Palmer Filter Equipment Company, Erie, Pa., a partnership firm
Filed Jan. 29, 1962, Ser. No. 169,197
2 Claims. (Cl. 251—169)

This invention relates to valves and, more particularly, to gate valves.

In the valve disclosed herein, initial upward movement of the stem during opening of the valve relieves the pressure on the actuating spring interimposed within the valve linkage assembly. Such movement takes place before any upward movement of the valve gate linkage assembly by reason of linkage construction.

At the same time of the above release of the vertically applied operating valve stem pressure, the interimposed spring through the valve linkage assembly completely withdraws the valve gates attached to the linkage completely and absolutely from contact with the face of, or in contact with, the valve seats. That is, before any upward movement of the valve gate linkage assembly incorporated as a central portion of the movable portion of the valve can be effected, all possible valve seat contact or friction is entirely eliminated.

Friction is also reduced by pressure applied to the right or left hand valve body entrance or, in other words, to the upstream or downstream sides of the valve in operation. The same sequence of operational procedure would apply to a vacuum line operation in reverse with the interimposed spring within the linkage assembly reacting against vacuum at the time of gate closure or opening instead of line pressure.

During closing of the valve, as the stem control arrangement is actuated to close the valve, the valve gate linkage assembly is lowered within the lower body of the valve until the valve gates and valve seats are in a juxtaposition of positive alignment. At such time, the lower portion of the valve linkage assembly termed a spider or yoke engages the boss at the lower portion of the valve body. When this engagement is effected, continued downward vertical pressure on the valve stem is transferred to the linkage spring arrangement supporting and holding the valve gate spring linkage assembly.

As further downward stem pressure is applied, the interimposed spring is compressed, allowing lateral movement of the linkage and effecting corresponding outward lateral movement of the attached valve gates. Built in design allows such lateral gate movement to continue until absolute and continued contact is effected between the valve gates and valve seats for definite positive closure.

During both opening and closing cycles outlined above, all operational friction of the valve gates and valve seats normally inherent in so-called in line valves has been eliminated. This is due to the fact that such aforementioned operational friction has been transferred from the very considerable area of the total valve gate and valve seat flat contact frictional drag contact surface of sizable area to a relatively minute vertical roller assembly appended to the said valve linkage assembly.

The rollers operate in vertical slots incorporated within the inner side portions of the valve body. These rollers are attached to the upper and lower sections, spiders, or yokes of the valve gate linkage assembly at the outer extremities thereof in direct opposition to the linkage gate movement.

As the valve is operated in either the open or closing cycle, lateral line pressure thrust is thereby transferred to the rollers operating within said slots within the valve body, thereby eliminating surface friction between the valve gate and valve seat to a rolling action between the valve gate linkage rollers and the valve body roller slots.

This same action of operation outlined above is adaptable to any position of the valve in relation to any deviation of location of the valve from a horizontal-vertical position or variation thereof.

It is, accordingly, an object of the present invention to provide an improved operating mechanism for a gate valve.

Another object of the invention is to provide an improved construction of a gate valve which will be simple and positive in operation and economical to manufacture.

Still another object of the invention is to provide a gate valve which positively eliminates operational and abrasive friction between the valve gates and valve seats during opening and closing cycles of valve operation.

A further object of the invention is to provide a valve mechanism which comprises a means of definite retraction of, and maintaining of, the valve gates as such, which, from the initial contact of the valve member with the valve seats until a time determined by horizontal movement of the actuating valve stem control and linkage mechanism, governs lateral control of the valve gates.

A still further object of the invention is to provide a valve wherein the upstream applied line pressure transmitted to the valve gate automatically causes retraction of both valve gates from contact with both valve seats by means of the linkage assembly, when vertical operating stem pressure is released in the initial valve opening cycle.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
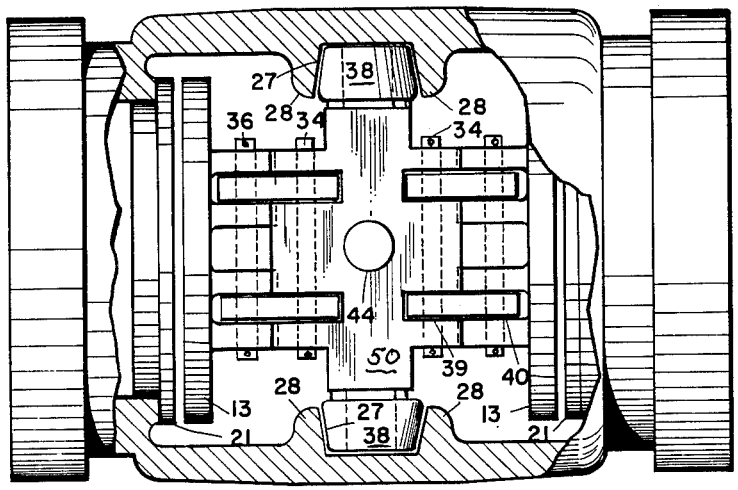
FIG. 1 is a view of a gate valve according to the invention partly in cross section with the top thereof broken away for better clarity.
Figure 2:
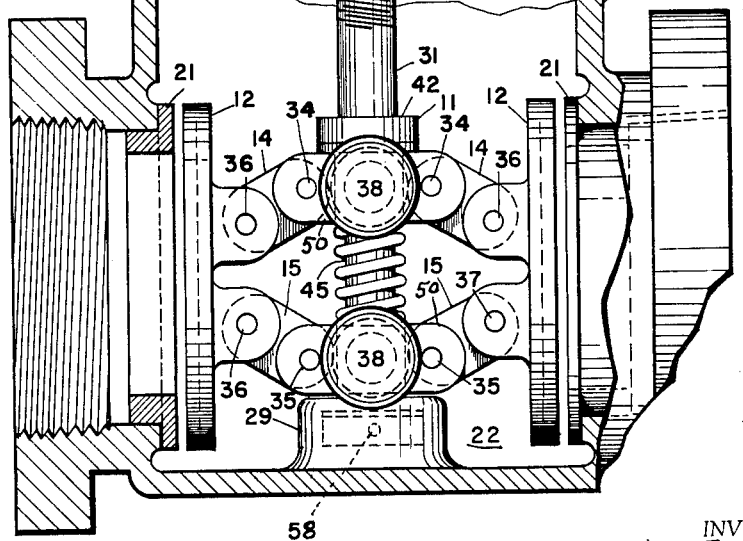
FIG. 2 is a partial longitudinal cross sectional view taken from the side of the valve shown in FIG. 1.
Figure 3:
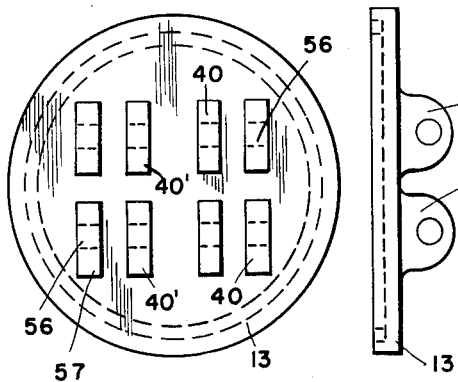
FIG. 3 is a view of the inside of a valve disk.
Figure 4:
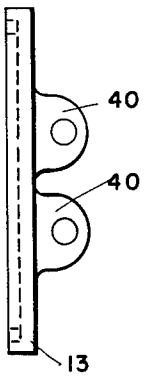
FIG. 4 is a side view of the disk shown in FIG. 3.
Figure 5:
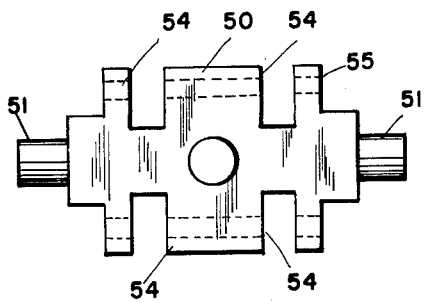
FIG. 5 is a top view of a yoke.
Figure 6:
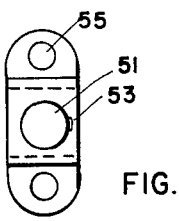
FIG. 6 is an end view of the yoke shown in FIG. 5.
Figure 7:
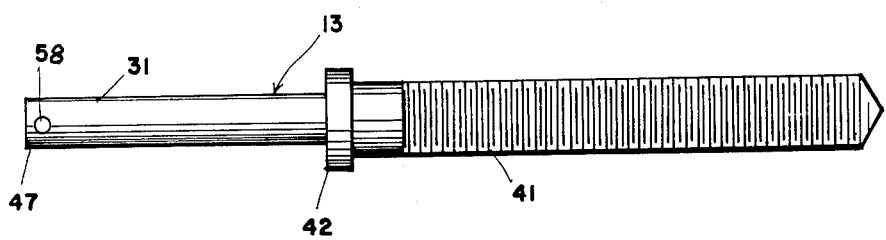
FIG. 7 is a view of the valve stem.

Now with more particular reference to the drawings, a valve is shown having a casing 10 with an inlet at one end and an outlet at the other end. The inlet and outlet are suitably threaded and/or flanged to receive connecting pipes.

The valve is principally made up of the casing 10, two valve disks 12, upper and lower yokes connected to the valve disks by arms 14, and a shaft 13. The shaft 13 has a top limit collar 42 integrally attached thereto which forces the top yoke toward the lower yoke. The lower yoke engages the stop at the lower part of the casing to compress a spring 45 and force the valve disks 12 apart from each other in toggle fashion.

The casing 10 has a valve chamber 22 therein. The valve disks, yokes, and arms move in the chamber 22. The head assembly and valve disks can be moved up in the upper part of the chamber 22 above the stream between the inlet and outlet when the valve is open or they can be moved down into the stream to closed position.

Valve seats 21 are in the form of hollow cylinders each having a radially directed flange and a cylindrical part which fits into the inlet and outlet, respectively. A valve head 25 is threaded internally at 24 to direct the head assembly up and down. A neck 26 of the valve body provides the upper part of the chamber and the inner side of the chamber has parallel, vertically extending ribs 28 which define a channel 27 at each side of the chamber 22. The channel 27 has inwardly converging sides as shown which receive frusto-conical rollers 38 on the ends of the yokes.

A boss stop 29 is integrally attached to the bottom of the valve body inside the chamber 22 and this boss stop is bored to receive a lower end 47 of the shaft 13 when the shaft is moved downward.

Upper and lower yokes 50 are in the form of heavy plates rectangular in cross section which have laterally extending axles 51 thereon. The axles 51 receive the rollers 38 and a cotter pin 53 may be put in the ends thereof to hold the rollers in place.

The yokes 50 have slots 54 formed therein and these slots receive the inner ends of the upper arms 14 and lower arms 15. Aligned holes 55 are formed through the yokes 50 and the arms 14 and 15 and pins 36 extend through the holes 55 and through the outer ends of the arms. They likewise extend through holes 56 in ears 40 on the valve disks to provide a space for one pin 36 to extend from one side to the other of each yoke and they have cotter pins in the ends thereof or other suitable fastening means to prevent them from coming out.

The spring 45 is supported on a stem 41 of the shaft 13 and each end of the spring engages one of the yokes 50, urging them apart.

In operation, the frusto-conical rollers 38 are put on the axles 51 and disposed in the channels 27. Then the shaft 13 may be moved upwardly or downwardly. When the shaft 13 is moved upwardly, the lower end thereof moves out of the bores in the boss stops 29 and the lower yoke comes out of engagement with the pin in bore 58. As the shaft further moves upwardly, the spring 45 and line pressure forces the two yokes 50 apart to bring the two valve disks 12 out of engagement with the valve seats 21. Then it can move upwardly into the chamber in the neck 26 and the valve disks 12 will be out of the flow stream between the inlet and outlet and also out of contact with the valve seats.

When it is desired to close the valve, the shaft 13 will be moved downwardly until its lower end 47 enters the bore in the boss stops 29. As the operator continues to move the shaft 13 downwardly, the lower end thereof will enter the bore 58 and the lower yoke will engage the boss stops. This will cause the collar 42 to force the upper yoke toward the lower yoke and compress the spring 45, bringing pins 34 and 35 toward each other. This will move the inner ends of the arms 14 together and force the valve disks 12 outward into engagement with the seats 21 in toggle fashion, thereby closing the valve.

The foregoing specification sets forth the invention in its preferred practical forms but it is understood that the structure shown is capable of modification within a range of equivalents without departing from the invention which is to be understood is broadly novel as is commensurate wth the appended claims.

The embodiments of the invention in which an exclusive property or privilege is claimed are defined as follows:

1. A valve comprising a casing in the form of a hollow body having a chamber therein, an inlet and an outlet to said chamber, a valve seat inside said chamber around said inlet and said outlet, a first valve disk disposed adjacent said inlet and a second valve disk disposed adjacent said outlet, said first and second valve disks each having spaced upper and lower ears thereon defining two spaced upper grooves above the center line of said disks and spaced lower grooves below the center line of said disks, an upper yoke and a lower yoke each having a central bore therein, a valve stem extending through said bores in said yokes, a compression spring on said valve stem between said yokes urging them apart, and means on said valve stem to limit the amount said yokes can move apart, said means limiting the movement of said yokes comprising a bored boss attached to the lower part of said chamber, the lower end of said valve stem entering said bore in said boss, said valve stem moving further downward relative to said lower yoke.

2. The valve recited in claim 1 wherein said chamber extends upwardly, providing a space to receive said yokes, ears, and valve disks above and out of the portion of said chamber between said inlet and said outlet.

References Cited by the Examiner

UNITED STATES PATENTS

| 961,594 | 6/10 | Fischer | 251—169 |
|---|---|---|---|
| 2,280,246 | 4/42 | McCullough | 74—520 XR |
| 2,684,221 | 7/54 | Wollam | 74—520 XR |

FOREIGN PATENTS

| 1,224,216 | 2/60 | France. |
|---|---|---|
| 16,443 | 1/04 | Great Britain. |
| 149,855 | 8/20 | Great Britain. |

LAVERNE D. GEIGER, *Primary Examiner.*

ISADOR WEIL, *Examiner.*